United States Patent
Akiyama et al.

(10) Patent No.: US 7,258,817 B2
(45) Date of Patent: Aug. 21, 2007

(54) MECHANOLUMINESCENCE MATERIAL AND PROCESS FOR PRODUCING THE SAME

(75) Inventors: Morito Akiyama, Tosu (JP); Chao-Nan Xu, Tosu (JP); Kazuhiro Nonaka, Tosu (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 215 days.

(21) Appl. No.: 10/519,937

(22) PCT Filed: Jul. 24, 2003

(86) PCT No.: PCT/JP03/09406

§ 371 (c)(1),
(2), (4) Date: Dec. 29, 2004

(87) PCT Pub. No.: WO2004/011572

PCT Pub. Date: Feb. 5, 2004

(65) Prior Publication Data

US 2005/0247912 A1    Nov. 10, 2005

(30) Foreign Application Priority Data

Jul. 29, 2002   (JP) .............................. 2002-220493

(51) Int. Cl.
*C09K 11/64* (2006.01)
*C09K 11/80* (2006.01)
*C09K 11/08* (2006.01)

(52) U.S. Cl. .............................................. 252/301.4 R

(58) Field of Classification Search .......... 252/301.4 R
See application file for complete search history.

(56) References Cited

U.S. PATENT DOCUMENTS

| | | | |
|---|---|---|---|
| 4,524,300 A * | 6/1985 | Rutten et al. | 313/487 |
| 6,159,394 A | 12/2000 | Akiyama et al. | |
| 6,280,655 B1 | 8/2001 | Xu et al. | |
| 6,835,958 B2 * | 12/2004 | Uemura | 257/79 |
| 6,841,933 B2 * | 1/2005 | Yamanaka et al. | 313/512 |
| 6,908,220 B2 * | 6/2005 | Misawa et al. | 362/541 |
| 2003/0012034 A1 * | 1/2003 | Misawa et al. | 362/545 |
| 2003/0122482 A1 * | 7/2003 | Yamanaka et al. | 313/512 |
| 2003/0160259 A1 * | 8/2003 | Uemura | 257/99 |

FOREIGN PATENT DOCUMENTS

JP          48-46582         7/1973

(Continued)

OTHER PUBLICATIONS

Smets et al, "2SrO*3Al2O3:Eu2+ and 1.29(Ba,Ca)o,6Al2O3:Eu2+", J. Electrochem. Soc., vol. 136, No. 7, Jul. 1989, pp. 2119-2123.*

(Continued)

*Primary Examiner*—C. Melissa Koslow
(74) *Attorney, Agent, or Firm*—Wenderoth, Lind & Ponack, L.L.P

(57) ABSTRACT

A mechanoluminescence material comprising a matrix of composite metal oxide containing strontium and aluminum, represented by the general formula $SrM^1Al_6O_{11}$ (wherein $M^1$ is an alkaline earth metal) or $SrM^2Al_3O_7$ (wherein $M^2$ is a rare earth metal), and further comprising, as luminescence centers, a metal selected from among rare earth metals and transition metals capable of emitting light when a carrier having been excited by mechanical energy returns to its ground state.

3 Claims, 1 Drawing Sheet

FOREIGN PATENT DOCUMENTS

| | | | |
|---|---|---|---|
| JP | 2000-063823 | * | 2/2000 |
| JP | 2000-63824 | | 2/2000 |
| JP | 2000-313878 | | 11/2000 |
| JP | 2001-49251 | | 2/2001 |
| JP | 2002-194349 | | 7/2002 |

OTHER PUBLICATIONS

Wang et al, "Research on the phase composition and microstructure of high-efficient phosphor Sr2AI6O11:Eu2+", Jour. Materl Sci. Lett., 18 (1999), pp. 1433-1435.*

Wang, et al., Research on the phase composition and microstructure of high-efficient phosphor $Sr_2Al_6O_{11}:Eu_{2+}$. Journal of Materials Science Letters (1999), vol. 18, No. 17, pp. 1433-1435.

Smets et al., $2SrO \; 3Al_2O_3:Eu_{2+}$ and $1.29(Ba, Ca)O,6Al_2O_3:Eu^{2+}$, Two New Blue-Emitting Phosphors. Journal of the Electrochemical Society (1999), vol. 136, No. 7, pp. 2119-2123.

Lian et al., Photoluminescence of $xSrO \; YAl_2 \; O_3$:Eu. Jour. Nat. Sci. Human Norm. Univ. (Mar. 2001), vol. 24, No. 1, pp. 39-41.

* cited by examiner

MECHANOLUMINESCENCE MATERIAL AND PROCESS FOR PRODUCING THE SAME

TECHNOLOGICAL FIELD

The present invention relates to a novel mechanoluminescence material capable of emitting light by receiving an external mechanical force as well as to a method for the preparation thereof.

BACKGROUND TECHNOLOGY

The phenomenon that a substance emits visible light or light in the vicinity of visible light at a low temperature, e.g., room temperature, when it receives a stimulation from outside is heretofore well known as a so-called phenomenon of fluorescence. Such a substance to cause the phenomenon of fluorescence or, namely, a phosphor, is employed for illuminating lamps such as fluorescent lamps and the like and for displays such as CRTs (cathode-ray tubes) or, namely, so-called Braun tubes, and the like.

The external stimulation to cause the phenomenon of fluorescence is usually given by ultraviolet light, electron beams, radiations such as X-rays, electric fields, chemical reactions and others but no investigations have yet been made for a material capable of emitting light when stimulated by a mechanical external force and the like.

The inventors previously made proposals for a high-brightness stress light-emitting material consisting of a substance formed from an aluminate having a non-stoichiometric composition and having lattice defects emitting light when carriers excited by mechanical energy return to the ground state or a substance containing, in the above matrix substance, rare earth metal ions or transition metal ions as the center ions of the center of luminescence (official publication of Japanese Patent Kokai No. 2001-49251) and a light-emitting material in which the matrix material was $Y_2SiO_5$, $Ba_3MgSiO_6$ or $BaSi_2O_5$ (official publication of Japanese Patent Kokai No. 2000-313878). These luminescence materials are not suitable for practical applications because of their still insufficient luminescence intensity and, in addition, the limitation of the range of the matrix materials to be used so that the application field is necessarily limited.

DISCLOSURE OF THE INVENTION

The present invention has been completed under these circumstances with an object to accomplish, by using a matrix material different from those in the conventional luminescence materials, an increase in the luminescence intensity and expansion of the application fields.

The inventors have continued extensive investigations in order to develop a novel mechanoluminescence material with the matrix material different from those in the prior art mechanoluminescence materials and, as a result, have arrived at a discovery that a novel mechanoluminescence material can be obtained including several materials exhibiting a very high luminescence intensity, by using certain composite metal oxides containing strontium and aluminum as the matrix material doped with metal ions of a specific kind as the center of luminescence leading to completion of the present invention on the base of this discovery.

Namely, the present invention provides a mechanoluminescence material characterized in that the matrix material is a composite metal oxide containing strontium and aluminum as represented by the general formula

$SrM^1Al_6O_{11}$ (I)

($M^1$ in the formula is an alkaline earth metal including strontium) or

$SrM^2Al_3O_7$ (II)

($M^2$ in the formula is a rare earth metal)

and the center of luminescence is a metal ion selected from a rare earth metal or a transition metal capable of emitting light when carriers excited by mechanical energy return to the ground state as well as a method for the preparation of the mechanoluminescence material which comprises the step in which powders of salts or oxides of the respective ingredient metals corresponding to the composite metal oxide containing strontium and aluminum as represented by the above-given general formula (I) or (II) is admixed with a salt or oxide of specific rare earth metals or transition metals capable of emitting light when carriers excited by mechanical energy and a flux return to the ground state in a proportion to make up 0.0001 to 20% by moles calculated for the metal atoms and blended; and the step of firing the thus obtained mixture at 400 to 1800° C. in a reducing atmosphere to effect doping of the center of luminescence.

BEST MODE FOR CARRYING OUT INVENTION

Figure 1:
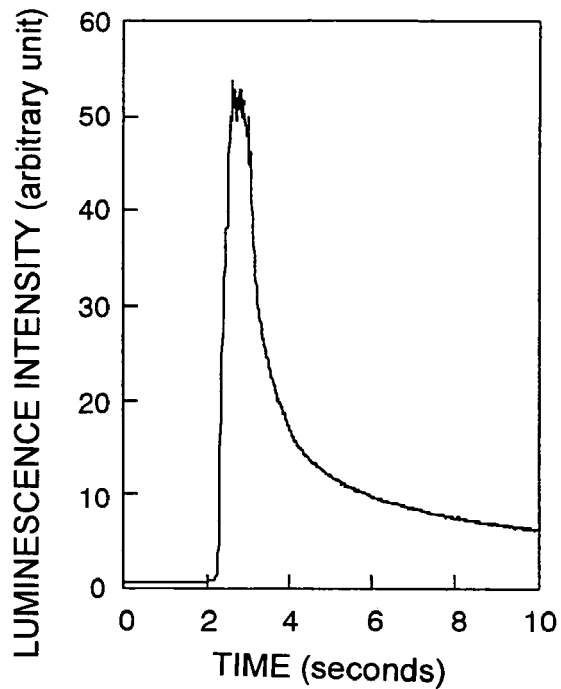
FIG. 1 is a graph showing the luminescence intensity as a function of lapsed time when a mechanical acting force is applied to a mechanoluminescence material as an example in Example 1 of the present invention.

In the following, the present invention is described in detail.

In the mechanoluminescence material of the present invention, a composite metal oxide containing strontium and aluminum forming the matrix material has a composition as represented by the above-given general formula (I) or (II). The alkaline earth metal as $M^1$ in the general formula (I) is preferably Ba, Ca, Sr or Mg.

Further, examples of the rare earth metal as $M^2$ include La, Y, Ce, Pr, Nd, Pm, Sm, Eu, Gd, Tb, Dy, Ho, Er, Tm, Yb and Lu of which La and Y are particularly preferable. $M^1$ and $M^2$ in these general formulas (I) and (II) can be a single kind or a combination of two kinds or more.

$Sr_2Al_6O_{11}$, $SrMgAl_6O_{11}$, $SrCaAl_6O_{11}$ and $SrBaAl_6O_{11}$ are preferable among the composite metal oxides as represented by the general formula (I) and $SrLaAl_3O_7$, $SrCeAl_3O_7$, $SrPrAl_3O_7$, $SrNdAl_3O_7$, $SrSmAl_3O_7$, $SrGdAl_3O_7$ and $SrYAl_3O_7$ are preferable among the composite metal oxides as represented by the general formula (II) since a high light-emitting intensity can be efficiently obtained. Among the above-mentioned composite metal oxides as represented by the general formula (II), $SrLaAl_3O_7$ and $SrYAl_3O_7$ are particularly preferable.

In the next place, the specified rare earth metal or transition metal ions can be any metal ions capable of emitting light when carriers excited by mechanical energy return to the ground state and are not particularly limited.

The rare earth metal can be exemplified, for example, by Sc, Y, La, Ce, Pr, Nd, (Pm), Sm, Eu, Gd, Tb, Dy, Ho, Er, Tm, Yb and Lu, and the transition metal other than rare earth metals can be exemplified, for example, by Ti, Zr, V, Cr, Mn, Fe, Co, Ni, Cu, Zn, Nb, Mo, Ta, W and the like.

These metals can serve singly for the center of luminescence or can serve for the center of luminescence as a combination of two kinds or more.

The metal which is optimum for the center of luminescence differs depending on the crystalline structure of the matrix material. The most preferable are, for example, Eu when the matrix material is $Sr_2Al_6O_{11}$, $SrMgAl_6O_{11}$, $SrLaAl_3O_7$ or $SrYAl_3O_7$ and Ce when it is $SrCaAl_6O_{11}$.

It is necessary that the matrix material contains a rare earth metal or a transition metal in a proportion to make up 0.0001 to 20% by moles calculated for the metal atoms. When this amount is smaller than 0.0001% by moles, no sufficient improvement can be obtained in the luminescence intensity while, when in excess over 20% by moles, the crystalline structure of the matrix material cannot be retained resulting in a decrease in the luminescence efficiency. A preferable content is in the range from 0.1 to 5.0% by moles.

The mechanoluminescence material of the present invention can be prepared, for example, by blending powders of salts or oxides of the respective ingredients capable of forming the composite metal oxide represented by the general formula (I) or (II) in a proportion corresponding to the respective composition of the general formulas, admixing, together with 5 to 20% by mass of a flux such as boric acid, a salt or oxide of the rare earth metal or transition metal in 0.0001 to 20% by moles or, preferably, in 0.1 to 5.0% by moles calculated for the metallic element and blending followed by firing at a temperature of 400 to 1800° C. or, preferably, 800 to 1500° C. in a reducing atmosphere so as to effect doping of the center of luminescence. The reducing atmosphere in this case includes an atmosphere of a gas mixture of hydrogen gas and an inert gas such as, for example, helium, argon and neon. The firing time is usually in the range from 1 to 10 hours.

The salts or oxides of the respective ingredient metals capable of forming the composite metal oxide, in this case, are exemplified, for example, by carbonates, nitrates, chlorides, acetates and the like of Sr, Ca, Ba, Mg, La, Y and the like as well as oxides of these metals or Al. Salts of rare earth metals or transition metals as the center of luminescence are exemplified, for example, by nitrates and chlorides.

The luminescence intensity of the mechanoluminescence material of the present invention obtained in this way is, as a trend, usually higher with a larger mechanical acting force applied though dependent on the mechanical acting force as the excitation source. Accordingly, it is possible to obtain the mechanical acting force added to the luminescence material by measuring the luminescence intensity thereby to afford non-contacting detection of the stress loaded on the material.

With regard to the mechanoluminescence material of the present invention, a laminated material can be prepared by forming a coating film containing the same on the surface of a base material.

Though without particular limitations with respect to this base material, the material thereof includes, for example, quartz, silicon, graphite, plastics, metals, cement and the like.

In the following, the present invention is described in more detail by way of examples although the present invention is never limited by these examples.

EXAMPLE 1.

A mechanoluminescence material was prepared by blending $SrCO_3$, $MgCO_3$ and $Al_2O_3$ each in a powder form having an average particle diameter of about 10 µm in a proportion corresponding to $SrMgAl_6O_{11}$ as the matrix material, thoroughly blending with further addition of 20% by moles of a boric acid powder (average particle diameter 10 µm) as a flux and 0.5% by moles (calculated for the metallic element) of a $Eu_2O_3$ powder to give the center of luminescence and firing the thus obtained blend at 1300° C. for 4 hours in an atmosphere of argon containing 5% by volume of hydrogen.

In the next place, a sample was prepared by pelletizing this mechanoluminescence material with an epoxy resin as a binder.

By using a vise, a mechanical action of 150 N was applied to this sample and the change with time in the luminescence intensity there is shown as a graph in FIG. 1. This sample emitted green light which was strong enough as to be clearly recognizable with naked eyes. The highest luminescence intensity (cps) there is shown in Table 1.

Figure 2:
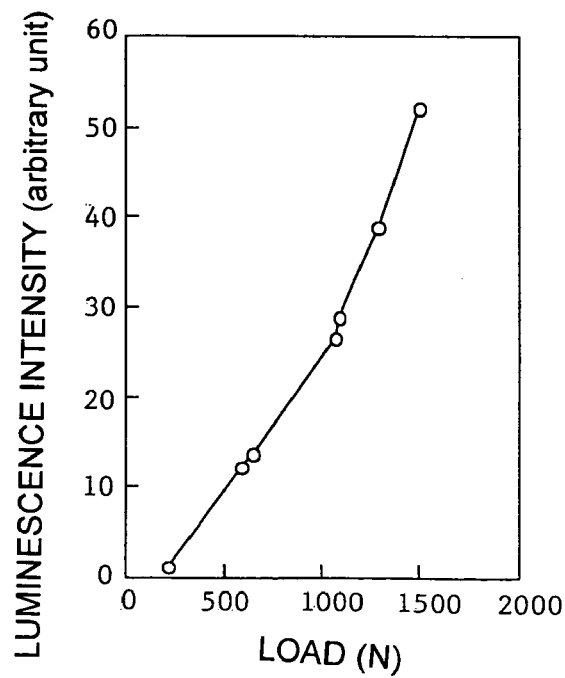
FIG. 2 is a graph showing the relationship between the luminescence intensity and the load applied to a luminescence material as an example in Example 1 of the present invention.

In the next place, observation was made for the condition of luminescence of this sample under varied loads applied thereto to examine the stress dependency. The results are shown in FIG. 2 as a graph.

As is understood from this figure, the luminescence intensity depended on the stress and was increased with an increase in the load. It is understood from this fact that the value of the stress applied can be estimated by measuring the luminescence intensity.

COMPARATIVE EXAMPLE

A mechanoluminescence material was prepared under just the same conditions as in Example 1 excepting for the omission of the $Eu_2O_3$ powder and the highest luminescence intensity was determined in the same manner as in Example 1. The result is shown in Table 1.

EXAMPLES 2 TO 4.

By using the matrix materials indicated in Table 1, mechanoluminescence materials with Eu to serve as the center were prepared in the same manner as in Example 1. The highest luminescence intensities thereof were determined and the results are shown in Table 1.

TABLE 1

| | Matrix material | Center of luminescence | luminescence intensity (cps) |
|---|---|---|---|
| Example 1 | $SrMgAl_6O_{11}$ | Eu | 24990 |
| Example 2 | $Sr_2Al_6O_{11}$ | Eu | 9787 |
| Example 3 | $SrLaAl_3O_7$ | Eu | 28694 |
| Example 4 | $SrYAl_3O_7$ | Eu | 4611 |
| Comparative Example | $SrMgAl_6O_{11}$ | None | 91 |

As is understood from this table, the luminescence intensity is remarkably increased by doping with a metal for the center of luminescence.

INDUSTRIAL UTILIZABILITY

According to the present invention, a novel mechanoluminescence material can be obtained which efficiently emits luminescence by a mechanical outer force such as a frictional force, shearing force, impact force, compressive force and others. Direct conversion of the above-mentioned mechanical outer forces into light can be accomplished by the luminescence of the material per se under action thereof so that a wide range of applications can be expected including a possibility of utilization as a quite novel device of luminescence and so on.

The invention claimed is:

1. A mechanoluminescence material wherein the matrix material is a composite metal oxide containing strontium and aluminum as represented by the formula $SrM^2Al_3O_7$ ($M^2$ in the formula is a rare earth metal) and the center of luminescence is europium.

2. The mechanoluminescence material described in claim 1 in which the composite metal oxide containing strontium and aluminum is $SrLaAl_3O_7$ or $SrYAl_3O_7$.

3. A method for the preparation of a mechanoluminescence material wherein powders of salts or oxides of the respective ingredient metals corresponding to a composite metal oxide containing strontium and aluminum as represented by the formula $SrM^2Al_3O_7$ ($M_2$ in the formula is a rare earth metal) are admixed with a salt or oxide of europium in a proportion to make up 0.0001 to 20% by moles calculated for the europium atoms and $M^2$ rare earth metal atoms and blended followed by firing at 400 to 1800° C. in a reducing atmosphere to effect doping of the center of luminescence.

* * * * *